(12) United States Patent
Stuempfle et al.

(10) Patent No.: US 9,104,753 B2
(45) Date of Patent: Aug. 11, 2015

(54) IDENTIFYING AN INCIDENT-ADDRESSING STEP

(71) Applicant: HEWLETT-PACKARD DEVELOPMENT COMPANY, L.P., Houston, TX (US)

(72) Inventors: Matthew A. Stuempfle, Raleigh, NC (US); Jonathan David Gibson, Austin, TX (US); John L. Ortman, Westerville, OH (US); Ronald Monson, Locust Grove, GA (US)

(73) Assignee: HEWLETT-PACKARD DEVELOPMENT COMPANY, L.P., Houston, TX (US)

( * ) Notice: Subject to any disclaimer, the term of this patent is extended or adjusted under 35 U.S.C. 154(b) by 174 days.

(21) Appl. No.: 13/781,826

(22) Filed: Mar. 1, 2013

(65) Prior Publication Data
US 2014/0250125 A1    Sep. 4, 2014

(51) Int. Cl.
*G06F 17/30* (2006.01)
(52) U.S. Cl.
CPC .................. *G06F 17/30705* (2013.01)
(58) Field of Classification Search
USPC .................................................. 707/705, 737
See application file for complete search history.

(56) References Cited

U.S. PATENT DOCUMENTS

| | | | |
|---|---|---|---|
| 5,132,811 A * | 7/1992 | Iwaki et al. ....................... 359/6 |
| 7,081,819 B2 * | 7/2006 | Martinez de Velasco Cortina et al. ........................ 340/572.7 |
| 7,671,746 B2 * | 3/2010 | Martinez de Velasco Cortina et al. ........................ 340/572.4 |
| 8,095,423 B2 * | 1/2012 | Nichols ........................ 705/26.1 |
| 8,136,164 B2 * | 3/2012 | Helman et al. ................... 726/25 |
| 8,271,528 B1 * | 9/2012 | Wilkinson et al. ............. 707/783 |
| 8,275,797 B2 * | 9/2012 | Grace et al. .................... 707/794 |
| 8,296,311 B2 * | 10/2012 | Rapp et al. ..................... 707/758 |
| 8,314,683 B2 * | 11/2012 | Pfeffer ............................ 340/7.3 |
| 8,315,327 B2 * | 11/2012 | Agee et al. ..................... 375/267 |
| 8,352,292 B2 * | 1/2013 | Hampton .......................... 705/4 |
| 2007/0038959 A1 * | 2/2007 | Bertram et al. ............... 715/846 |
| 2010/0191771 A1 | 7/2010 | Jones |
| 2012/0303772 A1 | 11/2012 | Ennis |

OTHER PUBLICATIONS

Nimsoft, Leveraging Your Service Desk to Scale Your MSP Business, Jul. 2011 (13 pages).
Microsoft, http://msprivatecloud.com/workflow-automation—Workflow Automation dated on or before Jan. 30, 2013 (2 pages).
http://www.tmcnet.com/channels/call-center-scheduling/articles/278499-activebatch-enhances-automated-job-scheduling-capabilities-enterprise-workload.htm—Call Center Scheduling Feature Article—ActiveBatch Enhances Automated Job Scheduling Capabilities for Enterprise Workload, Mar. 20, 2012 (3 pages).
Generation E Technologies, RESOLVE Run Book Automation, Discover the Power of Knowledge Management with the RESOLVE wiki-based Run Book Automation Solution, 2008 (3 pages).
NETIQ, Introduction: Run Book Automation, 2011 (1 page).
wiki.servicenow.com—SERVICENOW Product Documentation, Using the Graphical Workflow Editor, Aug. 2013 (3 pages).

* cited by examiner

*Primary Examiner* — Kim Nguyen
(74) *Attorney, Agent, or Firm* — Trop, Pruner & Hu, P.C.

(57) ABSTRACT

Relationships among incident-addressing steps, applications, and incidents are determined, based on information relating to the applications and the incidents. For addressing a given incident that occurred with respect to a particular application, at least one incident-addressing step is identified using the determined relationships.

16 Claims, 3 Drawing Sheets

IDENTIFYING AN INCIDENT-ADDRESSING STEP

BACKGROUND

A runbook can include information that describes tasks to be performed in response to incidents. In some examples, a runbook (which can be in electronic form or physical book form) can include steps for addressing incidents that may cause failures or faults in systems. A runbook can be created by designated personnel who have in-depth knowledge of systems and environments in which the systems are provided.

A runbook can be used manually by a human operator for identifying tasks to be performed when an incident is detected. Alternatively, a runbook in electronic form can be executed by a machine.

BRIEF DESCRIPTION OF THE DRAWINGS

Some embodiments are described with respect to the following figures.

DETAILED DESCRIPTION

Figure 1:
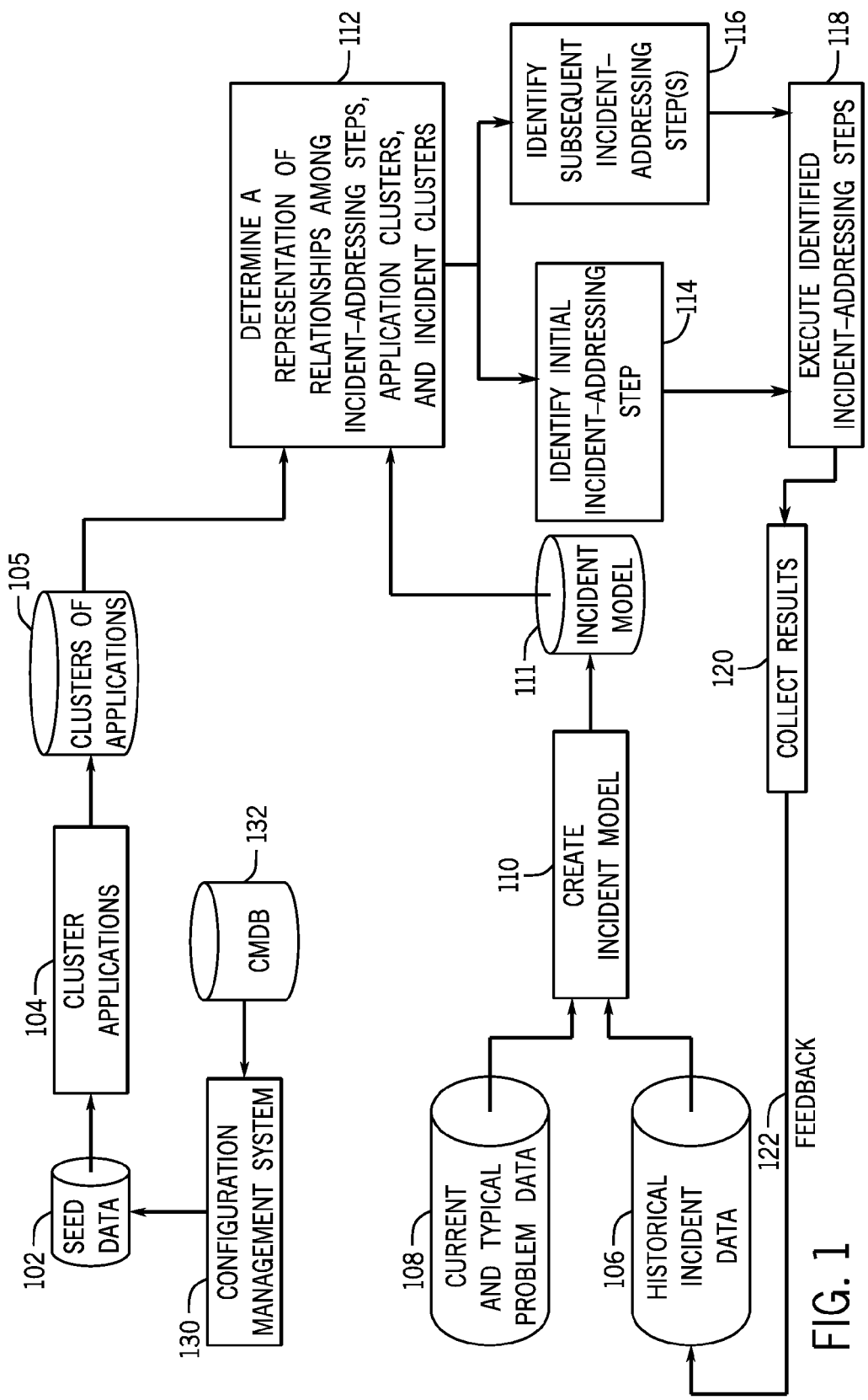
FIG. 1 is a schematic diagram of an autonomous runbook system according to some implementations.

Incidents in an information technology (IT) environment (which includes various systems) can lead to problems that may disrupt operation of the systems. Such disruption can lead to costly system downtime. Examples of problems that may occur in an IT environment include hardware failures, exceptions or errors of machine-readable instructions, communication failures, and so forth. An IT environment can include various different systems, including computing devices, storage devices, communication devices, machine-readable instructions, and so forth.

In some examples, runbooks can be used to identify tasks which can be performed to address incidents that may occur in an IT environment. An incident can refer to any event that may occur in the IT environment, where the incident can be due to operation of a machine or activity of a human. If un-addressed, the incident may lead to a problem. A runbook can refer to any collection of information that describes tasks that can be performed for addressing incidents. The tasks can be part of respective workflows, where a workflow can include a group of tasks to be performed for addressing a specific incident or incidents. A task that is identified to address an incident can also be referred to as an "incident-addressing step."

A runbook may be in electronic form, and may be used to automatically identify incident-addressing steps to take to address incidents that may arise, sometimes before a problem actually occurs in an IT environment due to the incidents.

In the ensuing discussion, systems in an IT environment are also referred to as applications, where an application can refer to hardware or machine-readable instructions or a combination of both. There can be multiple different types of applications, where a type of application can be defined by a combination of attributes. Examples of attributes that can define an application can include the following: application architecture, language of machine-readable instructions, type of physical hardware device, a number of tiers of the application, a server type (e.g. web server, application server, database server, etc.), network type, storage type, and other attributes.

In some cases, a runbook may be created by human personnel with in-depth knowledge of an IT environment, the applications within the IT environment, and incidents that may arise in the IT environment and that may affect operation of the applications in different ways based on a wide variety of factors. Manual creation of runbooks can be time-consuming and costly, particularly since different IT environments associated with different enterprises (e.g. business concerns, government agencies, educational organizations, etc.) may have different application attributes, and incidents in different IT environments may affect applications in different ways. Also, reliance on manual creation of runbooks may lead to creation of incomplete or inaccurate runbooks. An incomplete or inaccurate runbook may not allow for the adequate identification of incident-addressing steps for addressing incidents that may arise. Moreover, runbooks may become out-of-date as new incidents are encountered, as new applications are deployed, or as existing applications are modified.

In accordance with some implementations, an autonomous runbook system is provided that (1) autonomously updates (without having to rely on human intervention) a runbook according to adaptive learning based on prior performance of incident-addressing steps; and (2) automatically identifies incident-addressing steps to take to address incidents that may occur in an IT environment.

The autonomous runbook system is able to learn what incident-addressing steps were successful or not successful in addressing incidents that occurred with respect to certain applications within a given IT environment. The autonomous runbook system can use such learned knowledge in updating a runbook and to identify incident-addressing steps for addressing subsequent incidents.

By using the autonomous runbook system according to some implementations, a runbook does not have to be pre-defined by a human. Instead, the autonomous runbook system can automatically create the runbook based on certain input information (discussed further below). In other examples, an initial runbook can be first created by a human, and the initial runbook can later be updated by the autonomous runbook system based on adaptive learning.

FIG. 1 is a schematic diagram of an example autonomous runbook system according to some implementations. The autonomous runbook system provides a runbook that includes different information depicted in FIG. 1, where such information allows for the automated identification of incident-addressing steps for addressing detected incidents in an IT environment.

Seed data 102 is used in performing clustering (at 104) of applications to identify multiple clusters of applications (105). The seed data 102 can include information regarding applications, information relating to an IT environment in which the applications are deployed, incident-addressing steps that can be taken to address incidents regarding the applications, and other information. Information about applications can include various attributes associated with the applications, such as those attributes listed above. Clustering of applications is based on the attributes of the applications, where applications sharing similar values of the attributes are provided into a respective application cluster.

As further depicted in FIG. 1, historical incident data 106 as well as current and typical problem data 108 are used for creating (at 110) an incident model 111. The historical incident data 106 can include information pertaining to incidents that have occurred in the past in a given IT environment, as well as incident-addressing steps that have been taken to address the incidents. The historical incident data 106 can also include information indicating whether or not a given incident-addressing step (or set of incident-addressing steps) was successful in addressing an incident, to prevent the occurrence of a problem.

The current and typical problem data 108 identifies any current problems and typical problems (problems that are considered to likely occur in a given IT environment). The incident model 111 that is created (at 110) relates various incidents to problems. The incident model 111 can indicate how certain incidents can give rise to respective problems. The incident model 111 can also include information pertaining to which incident-addressing steps have been successful in preventing problems from occurring due to incidents.

The incident model 111 also includes information relating to clusters of incidents. Each incident can include a respective set of attributes, and clustering of the incidents into respective incident clusters can be based on the attributes of the incidents.

Using the application clusters 105 and incident model 111, the autonomous runtime system is able to determine (at 112) a representation of relationships among the application clusters, the incident clusters, and incident-addressing steps. In some examples, the representation that is generated (at 112) can be a graphical representation in which the application clusters, incident clusters, and incident-addressing steps are placed based on attribute values associated with the applications, incidents, and incident-addressing steps. Attribute values can refer to values of attributes that are associated with each of the applications, incidents, incident-addressing steps. The attribute values can define vectors that correspond to positions in the graphical representation. In such implementations, the relationships among the application clusters, incident clusters, and incident-addressing steps can be geometric relationships. In other examples, other types of representations of relationships among application clusters, incident clusters, and incident-addressing steps can be derived.

Using the relationships in the generated representation, the autonomous runbook system can identify (at 114) an initial incident-addressing step for addressing a currently detected given incident that has occurred with respect to a particular application in a given IT environment. In some implementations, the identified initial incident-addressing step can be the incident-addressing step in the graphical representation that is closest (geometrically) to an incident cluster containing the current incident and the application cluster containing the particular application.

Although reference is made to a single current incident and single application related to the current incident, it is noted that techniques according to some implementations can be applied to multiple current incidents and affected applications.

Using regression analysis based on historical information (contained in the incident model 110), subsequent incident-addressing step(s) that is (are) to be performed for addressing the detected incident can be identified (at 116). The regression analysis based on the historical information can identify those incident-addressing steps that have been taken in the past with respect to incidents and applications that are similar to the current given incident and the associated particular application. The historical information can indicate effectiveness of incident-addressing steps in preventing a problem from occurring in response to a respective incident.

In some implementations, the regression analysis for identifying subsequent incident-addressing step(s) to take can also be based on industry standard data, which includes data describing what incident-addressing steps are typically taken to address respective incidents occurring with respect to particular applications.

It is noted that addressing an incident is usually performed using a workflow that includes multiple incident-addressing steps, where each incident-addressing step can be determined by a result of previously executed incident-addressing steps. For example, if an operator first pings a server on a specific network interface to determine if the server is available or not, an affirmative result will indicate to the operator to go to one step, while a negative result may indicate that the operator needs to attempt to access the server on another network interface. Additionally, a workflow of incident-addressing steps may be impacted by the historical context of a given IT environment. An example here would be an application that has repeatedly experienced issues with a specific network card. In this case, it may be more efficient to restart the network interface via a management network rather than reboot an entire server. Such historical context can be part of the historical data in the incident model 111.

The identified incident-addressing steps (those identified at 114 and 116) can then be executed (at 118). The results of the applied incident-addressing steps are collected (at 120) and provided as feedback (122) to the historical incident data 106. The feedback (122) enables the adaptive learning that is used by the autonomous runbook system according to some implementations. The adaptive learning allows the autonomous runbook system to adapt its selection of incident-addressing steps for addressing other incidents that may be later detected. Adapting the selection of incident-addressing steps for addressing subsequent incidents effectively provides an update of a runbook that is represented by the application clusters 105, the incident model 111, and the representation of relationships among application clusters, incident clusters, and incident-addressing steps determined (at 112).

In some examples, in addition to being able to use the feedback 122 to update the historical incident data 106, to thereby affect how the autonomous runbook system is able to select incident-addressing steps for addressing other incidents, the seed data 102 that is used in clustering applications (at 104) can also be updated by a configuration management system 130. The configuration management system 130 is able to access a configuration management database (CMDB) 132, which is a repository of information relating to various components of an IT environment. The CMDB 132 can contain details regarding applications of an IT environment. As configurations of applications change, or as new applications are added, the CMDB 132 can be updated. The configuration management system 130 can detect such modifications in the CMDB 132, and can update the seed data 102 correspondingly, which affects how applications are clustered (at 104). In this way, the clusters of applications 105 can be modified due to changes in applications or as new applications are added, which causes a corresponding change in the determined representation (as determined at 112) of relationships among incident-addressing steps, application clusters, and incident clusters.

Each application in an IT environment can be represented as a d-dimensional vector ($d \geq 1$), where each dimension represents a discrete attribute. In some examples, a vector A representing an application can be defined as $A=[a_1, a_2, \ldots, a_d]$, where $a_i$ ($i=1$ to d) represents a respective attribute. As noted above, examples of application attributes can include some or all of the following: application architecture, language of machine-readable instructions, type of physical hardware device, a number of tiers of the application, a server type (e.g. web server, application server, database server, etc.), network type, storage type, and other attributes. The number of attributes for an application may be specific to a particular IT environment. As the autonomous runback system learns, additional attributes may be added.

Similar incidents encountered with respect to similar applications often use similar incident-addressing steps to address the incidents. This characteristic can be leveraged to allow for efficient identification of incident-addressing steps by clustering applications into multiple application clusters and clustering incidents into multiple incident clusters. As noted above, the autonomous runbook system can identify incident-addressing steps to take based on relationships of the incident-addressing steps to the application clusters and incident clusters.

In accordance with some implementations, a reference application can be defined, where a reference application can be viewed as an application having a target state (a specific combination of values of attributes that define an application). There can be multiple reference applications corresponding to different combinations of application attribute values. Each reference application can form a centroid of a respective application cluster. Most applications would not match a reference application, but the similarity of applications to reference applications can be useful in resolution of incidents.

A reference application is represented by a d-dimensioned vector that has a respective specific combination of attribute values. The d-dimensioned vector that represents the reference application defines a centroid around which similar applications are clustered. In some examples, clustering of applications is accomplished using k-means clustering. K-means clustering clusters data (in this case applications) into k (where k>1) clusters. Each cluster is centered at the centroid represented by a respective reference application. In other examples, other clustering techniques can be used for clustering applications into multiple clusters.

As noted above, incidents can also be clustered, as part of the incident model creation (110) in FIG. 1. In some examples, k-means clustering can also be used to cluster incidents into k incident clusters. In other examples, other clustering techniques can be used for clustering incidents. In some examples, each incident can be represented as a three-dimensional vector, where the three dimensions represent the following attributes: incident severity $I_s$ (which indicates a severity level of an incident), incident source $I_o$ (which identifies a source of the incident), and incident resolution $I_r$ (which describes how the incident was resolved previously). An incident vector I can be defined as $I=[I_s\ I_o\ I_r]$. In other examples, an incident can be represented using other attributes.

Figure 2:
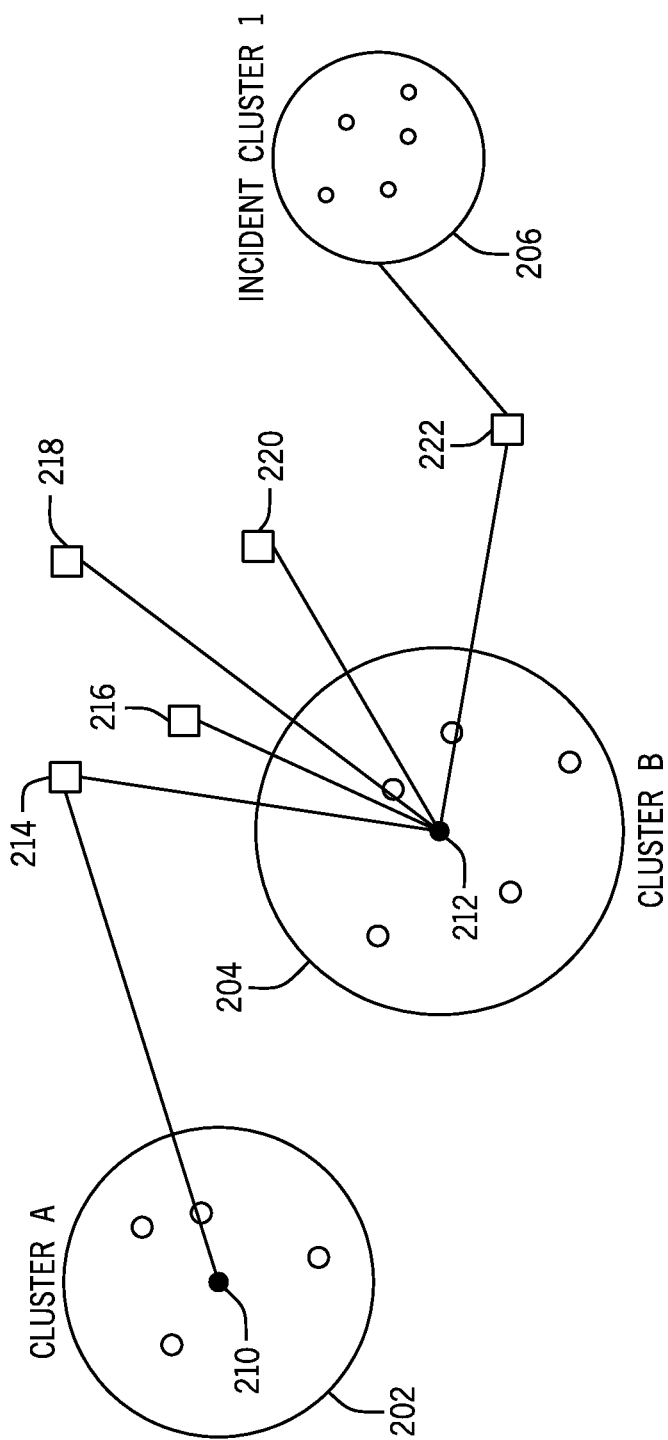
FIG. 2 is a schematic diagram illustrating a graphical representation containing clusters of applications, clusters of incidents, and incident-addressing steps, according to some implementations.

FIG. 2 illustrates an example graphical representation in which k-means clustering has been applied to identify k application clusters 202 and 204, and k incident clusters 206 and 208. In the example of FIG. 2, k is equal to two. Each application cluster 202 and 204 includes dots representing respective applications. The centroid 210 or 212 of the respective application cluster 202 or 204 corresponds to the reference applications as discussed above. Each incident cluster 206 and 208 also includes dots that represent respective incidents.

FIG. 2 also shows incident-addressing steps (e.g. 214, 216, 218, 220, 222) as boxes positioned within the d-dimensional space of FIG. 2, as a result of geometric relationships of the incident-addressing steps with respective incident clusters and application clusters. Each incident-addressing step can also be associated with attributes, and the values of those attributes (as determined from historical data and industry standard data) can be used to position the incident-addressing step in the graphical representation of FIG. 2. In some examples, the historical data and industry standard data can specify that a given incident-addressing step is used to address a given incident (represented by I) that has occurred with respect to a particular application (represented by A). In such an example, a vector B representing the incident-addressing step can be computed by performing vector multiplication, as follows: $B=A\cdot I$.

As discussed in connection with FIG. 1, the autonomous runbook system first identifies (at 114) an initial incident-addressing step to take to address a current incident that has occurred with respect to a particular application, using the representation of relationships determined (at 112). The representation can be in the form of the graphical representation of FIG. 2, for example. The initial incident-addressing step can be the incident-addressing step (from among the steps 214, 216, 218, 220, and 222) that is closest (such as by using a nearest neighbor technique) to the incident cluster and application cluster containing the current incident and particular application, respectively.

In some examples, the autonomous runbook system can be configured with a threshold (e.g. a distance threshold) that is used in deciding whether or not an incident-addressing step would be effective for addressing a given incident that occurred with respect to a particular application. For example, if an incident-addressing step does not fall within a specified distance threshold of an application cluster and incident cluster, then the likelihood that the incident-addressing step would be effective is low, and therefore, the autonomous runbook system would not use the incident-addressing step. If there are no identified incident-addressing steps that fall within the distance threshold, then a notification can be sent to alert a human operator to take an action, in some examples.

Once the initial incident-addressing step has been identified, the autonomous runbook system can execute the initial incident-addressing step. As discussed above, the next step following the initial incident-addressing step is determined using regression analysis (at 116 in FIG. 1), based on results of the initial incident-addressing step, as well as the historical data for similar applications and incidents. The historical data can indicate a historical success factor of an incident-addressing step for a given incident, where the historical success factor can indicate whether or not the incident-addressing step was successful in addressing the given incident (in other words, the historical success factor indicates an effectiveness of an incident-addressing step). This historical success factor for each incident-addressing step can be used as a way to determine which subsequent incident-addressing step to select. The process of continuing to identify subsequent incident-addressing steps can continue until the current incident is resolved.

As identified incident-addressing steps are executed, a problem caused by an incident may be resolved, and information can be collected as to the effectiveness of the identified incident-addressing steps. Such information can be fed back to the autonomous runbook system. Over time, the autonomous runbook system can learn what incident-addressing steps are more effective in solving a problem, and in what order to execute the incident-addressing steps.

Figure 3:
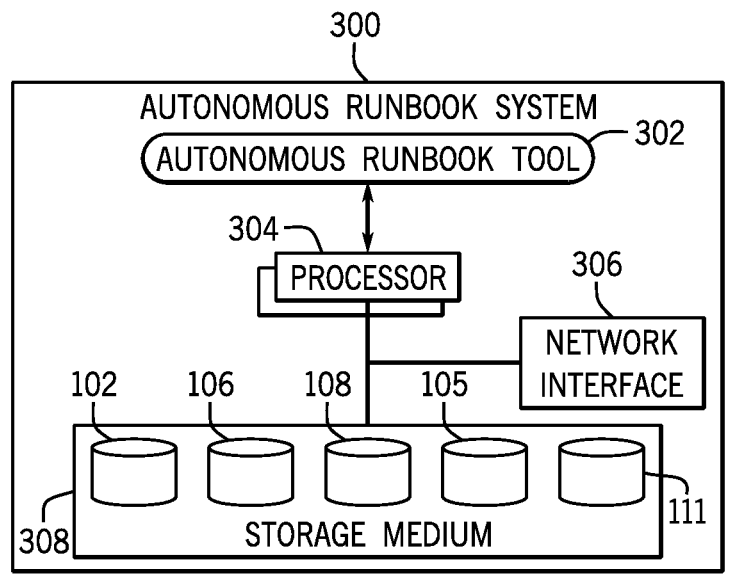
FIG. 3 is a block diagram of an example system that incorporates some implementations.

FIG. 3 is a block diagram of an example autonomous runbook system 300 according to some implementations. The autonomous runbook system 300 includes an autonomous runbook tool 302 that is executable on one or multiple processors 304, such as to perform various tasks depicted in FIG. 1. The processor(s) 304 can be coupled to a network interface 306 and a storage medium (or storage media) 308. The autonomous runbook system 300 is able to communicate over a data network through the network interface 306. The storage medium (or storage media) 308 can store various data structures, such as data structures depicted in FIG. 1.

Figure 4:
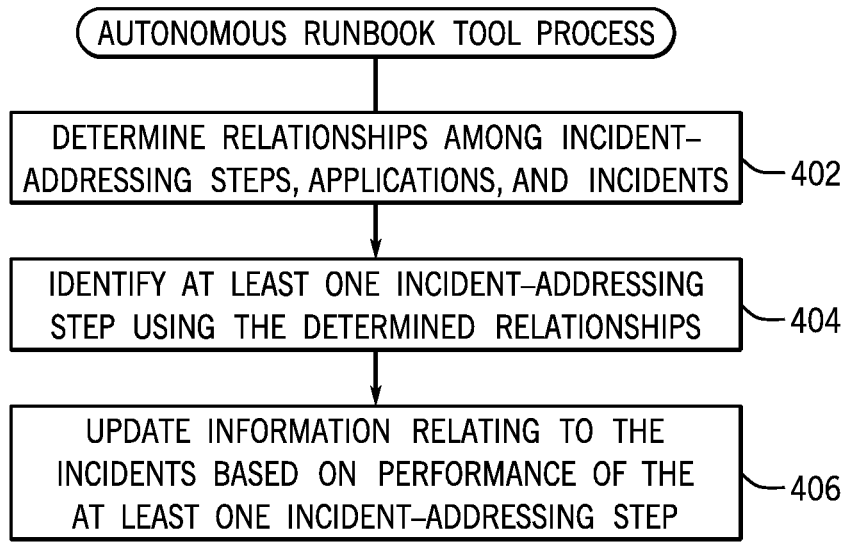
FIG. 4 is a flow diagram of a process according to further implementations.

FIG. 4 is a flow diagram of a process that can be performed by the autonomous runbook tool 302, according to alternative implementations. According to the FIG. 4 process, the autonomous runbook tool 302 determines (at 402) relationships among incident-addressing steps, applications, and incidents, based on information relating to the applications and the incidents. The determining performed at 402 is similar to the determining performed at 112 in FIG. 1.

For addressing a given incident that occurred with respect to a particular application, the autonomous runbook tool 302 identifies (at 404) at least one incident-addressing step using the determined relationships. The identifying performed at 404 can include identifying an initial incident-addressing step (similar to that performed at 114 in FIG. 1) and identifying any subsequent incident-addressing step(s) (similar to that performed at 116 in FIG. 1).

The autonomous runbook tool 302 updates (at 406) the information relating to the incidents based on performance of the identified at least one incident-addressing step, where the updated information can be used for subsequently identifying incident-addressing steps for other incidents. The updating of the information performed at 406 corresponds to the adaptive learning feature of the autonomous runbook tool 302.

By using an autonomous runbook system according to some implementations, incident-addressing steps can be identified relatively quickly for addressing currently detected incidents. Runbooks can be created without lengthy manual processes. In addition, runbooks can be autonomously updated based on information collected about incident-addressing steps that have been executed to address incidents.

Machine-readable instructions of modules discussed above (such as the autonomous runbook tool 302 of FIG. 3) can be loaded for execution on a processor or processors (e.g. 304 of FIG. 3). A processor can include a microprocessor, microcontroller, processor module or subsystem, programmable integrated circuit, programmable gate array, or another control or computing device.

Data and instructions are stored in respective storage devices, which are implemented as one or more computer-readable or machine-readable storage media. The storage media include different forms of memory including semiconductor memory devices such as dynamic or static random access memories (DRAMs or SRAMs), erasable and programmable read-only memories (EPROMs), electrically erasable and programmable read-only memories (EEPROMs) and flash memories; magnetic disks such as fixed, floppy and removable disks; other magnetic media including tape; optical media such as compact disks (CDs) or digital video disks (DVDs); or other types of storage devices. Note that the instructions discussed above can be provided on one computer-readable or machine-readable storage medium, or alternatively, can be provided on multiple computer-readable or machine-readable storage media distributed in a large system having possibly plural nodes. Such computer-readable or machine-readable storage medium or media is (are) considered to be part of an article (or article of manufacture). An article or article of manufacture can refer to any manufactured single component or multiple components. The storage medium or media can be located either in the machine running the machine-readable instructions, or located at a remote site from which machine-readable instructions can be downloaded over a network for execution.

In the foregoing description, numerous details are set forth to provide an understanding of the subject disclosed herein. However, implementations may be practiced without some or all of these details. Other implementations may include modifications and variations from the details discussed above. It is intended that the appended claims cover such modifications and variations.

What is claimed is:

1. A method comprising:

determining, by a system having a processor, geometric relationships among incident-addressing steps, clusters of applications, and clusters of incidents, based on information relating to the applications and the incidents, wherein each of the clusters of applications includes a respective plurality of applications, and each of the clusters of incidents includes a respective plurality of incidents;

for addressing a given incident that occurred with respect to a particular application, identifying, by the system, at least a first incident-addressing step using the determined geometric relationships, wherein the first incident-addressing step is identified based on determining that the first incident-addressing step is a closest of the incident-addressing steps to an application cluster including the particular application and to an incident cluster including the given incident, the application cluster being one of the clusters of applications, and the incident cluster being one of the clusters of incidents; and updating, by the system, the information based on performance of the identified at least first incident-addressing step, wherein the updated information is for subsequent use in identifying an incident-addressing step for another incident.

2. The method of claim 1, wherein identifying the at least first incident-addressing step is part of identifying a workflow of incident-addressing steps for addressing the given incident, wherein identifying the workflow comprises:

identifying the first incident-addressing step as an initial incident-addressing step for addressing the given incident that occurred with respect to the particular application.

3. The method of claim 2, wherein identifying the workflow further comprises:

identifying a subsequent incident-addressing step after the initial incident-addressing step for addressing the given incident that occurred with respect to the particular application; and adding the subsequent incident-addressing step to the workflow.

4. The method of claim 3, wherein identifying the subsequent incident-addressing step is based on a result of the initial incident-addressing step and based on historical data that includes information indicating effectiveness of incident-addressing steps for addressing incidents that occurred with respect to corresponding applications.

5. The method of claim 1, wherein the information relating to the clusters of incidents include historical incident data relating to incidents that have occurred within a given information technology environment.

6. The method of claim 1, further comprising generating a graphical representation of the relationships, the graphical representation further including the incident-addressing steps, the clusters of applications, and the clusters of incidents.

7. The method of claim 6, further comprising positioning representations of the incident-addressing steps, applications, and incidents in the graphical representation based on values of corresponding attributes of the incident-addressing steps, applications, and incidents.

8. An article comprising at least one non-transitory machine-readable storage medium storing instructions that upon execution cause a system to:
   identify clusters of applications and clusters of incidents, wherein the identifying is based on attributes of the applications and the incidents;
   determine geometric relationships among incident-addressing steps and the clusters of applications and the clusters of incidents in a graphical representation;
   for addressing a given incident that occurred with respect to a particular application, identify at least a first incident-addressing step of the incident-addressing steps using the determined geometric relationships, the first incident-addressing step being geometrically closest, in the graphical representation, to a given cluster of applications containing the particular application and to a given cluster of incidents containing the given incident, the given cluster of applications being one of the clusters of applications, and the given cluster of incidents being one of the clusters of incidents; and
   update information relating to the applications and the incidents based on performance of the identified at least first incident-addressing step, wherein the updated information is for subsequent use in identifying an incident-addressing step for another incident.

9. The article of claim 8, wherein identifying the at least first incident-addressing step is part of identifying a workflow that comprises the first incident-addressing step, and wherein identifying the workflow comprises:
   determining a subsequent incident-addressing step after the identified at least first incident-addressing step to use for addressing the given incident, based on using historical information pertaining to past incident-addressing steps; and
   adding the subsequent incident-addressing step to the workflow.

10. The article of claim 9, wherein the instructions upon execution cause the system to further:
    collect information relating to results of executing the identified at least one incident-addressing step and the subsequent incident-addressing step; and
    use the collected information in adaptive learning by the system for modifying a behavior of the system in identifying incident-addressing steps for addressing subsequent incidents.

11. The article of claim 10, wherein the instructions upon execution cause the system to further update the historical information using the collected information.

12. The article of claim 10, wherein the instructions upon execution cause the system to:
    update information relating to applications in response to a change in an application or an addition of a new application; and
    re-iterate the identifying of the clusters of applications using the updated information.

13. The article of claim 8, wherein the identified first incident-addressing step is within a specified distance threshold to the given cluster of applications containing the particular application and the given cluster of incidents containing the given incident, and wherein the instructions upon execution cause the system to further:
    in response to determining that no incident-addressing step is within the specified distance threshold to the given cluster of applications containing the particular application and the given cluster of incidents containing the given incident, send a notification to a user.

14. A system comprising:
    at least one processor to:
        determine relationships among incident-addressing steps, clusters of applications, and clusters of incidents, based on information relating to the applications and the incidents, wherein the determined relationships include geometric relationships;
        for addressing a given incident that occurred with respect to a particular application, identify at least a first incident-addressing step using the determined geometric relationships, wherein the first incident-addressing step is identified based on determining that the first incident-addressing step is a closest of the incident-addressing steps to an application cluster including the particular application and to an incident cluster including the given incident, the application cluster being one of the clusters of applications, and the incident cluster being one of the clusters of incidents; and
        update the information based on performance of the identified at least first incident-addressing step, wherein the updated information is for subsequent use in identifying an incident-addressing step for another incident.

15. The system of claim 14, wherein the at least one processor is to cluster the applications to form the clusters of applications using values of attributes of the applications, and to cluster the incidents to form the clusters of incidents using values of attributes of the incidents.

16. The system of claim 14, wherein the incident-addressing steps, the clusters of applications, and the clusters of incidents are represented in a graphical representation.

* * * * *